(12) United States Patent
Fu (10) Patent No.: US 7,921,824 B2
(45) Date of Patent: Apr. 12, 2011

(54) IGNITION DEVICE FOR A MOTOR, ESPECIALLY IN A MOTOR VEHICLE

(75) Inventor: Wei Fu, Düsseldorf (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 577 days.

(21) Appl. No.: 11/990,157

(22) PCT Filed: Jun. 22, 2006

(86) PCT No.: PCT/EP2006/005983
§ 371 (c)(1),
(2), (4) Date: Feb. 7, 2008

(87) PCT Pub. No.: WO2007/019909
PCT Pub. Date: Feb. 22, 2007

(65) Prior Publication Data
US 2010/0132646 A1   Jun. 3, 2010

(30) Foreign Application Priority Data

Aug. 12, 2005  (DE) .......................... 10 2005 038 437

(51) Int. Cl.
*F02N 11/00* (2006.01)

(52) U.S. Cl. ................. 123/179.1; 307/10.3; 340/426.3; 70/239

(58) Field of Classification Search ............... 123/179.1, 123/179.2; 307/10.3, 10.6; 340/426.16, 340/426.17, 426.3; 70/237–239
See application file for complete search history.

(56) References Cited

U.S. PATENT DOCUMENTS

| | | | | |
|---|---|---|---|---|
| 3,660,624 A | * | 5/1972 | Bell | 200/43.05 |
| 4,146,761 A | | 3/1979 | Sung | |
| 5,255,547 A | * | 10/1993 | Burr et al. | 70/252 |
| 5,656,867 A | * | 8/1997 | Kokubu | 307/10.5 |
| 5,801,614 A | * | 9/1998 | Kokubu | 340/425.5 |
| 6,095,415 A | * | 8/2000 | Shouji | 235/449 |
| 6,382,003 B1 | * | 5/2002 | Watanuki et al. | 70/252 |
| 6,389,856 B1 | * | 5/2002 | Watanuki et al. | 70/186 |

(Continued)

FOREIGN PATENT DOCUMENTS

DE   102 33 511   4/2004

(Continued)

*Primary Examiner* — Hai H Huynh
(74) *Attorney, Agent, or Firm* — Lucas & Mercanti, LLP; Klaus P. Stoffel (57) ABSTRACT

The invention relates to an ignition device comprising a manually activatable slide that determines the desired working position of the slide by means of a slide control system. One such slide control system consists of a cam and a rod guided in said cam. The inventive ignition device also comprises an ignition switch which is electrically connected to the motor and can be switched between different switching positions according to the translatory movement of the slide. According to the invention, the ignition switch is embodied as a rotary switch comprising an input member for switching the contacts thereof. A rotor (30) is mounted in the housing in a rotary manner and connected to the input member of the ignition switch in a rotationally fixed manner. The rotor (30) forms part of the slide control system comprising at least two lock-in positions (38.1, 38.2) for at least two stable working positions (25.1, 25.3) of the slide. During the activation of the slide, the slide control system converts the translatory movement of the slide into a rotary movement (36) of the rotary switch.

19 Claims, 9 Drawing Sheets

U.S. PATENT DOCUMENTS

| | | | |
|---|---|---|---|
| 6,700,220 B2 * | 3/2004 | Bayeur et al. | 307/10.2 |
| 6,703,721 B1 * | 3/2004 | Kito | 307/10.3 |
| 6,794,768 B2 * | 9/2004 | Uselli | 307/10.5 |
| 6,918,368 B2 * | 7/2005 | Nantz et al. | 123/179.2 |
| 6,941,779 B2 * | 9/2005 | Shigeyama et al. | 70/186 |
| 7,023,318 B1 * | 4/2006 | Geiger et al. | 340/5.31 |
| 7,267,018 B2 * | 9/2007 | Kai | 73/865.8 |
| 7,514,811 B2 * | 4/2009 | Matsubara et al. | 307/10.5 |
| 7,591,158 B2 * | 9/2009 | Konno et al. | 70/252 |

FOREIGN PATENT DOCUMENTS

| | | |
|---|---|---|
| EP | 1 279 576 | 1/2003 |
| EP | 1 503 393 | 2/2005 |
| FR | 2 127 164 | 9/1972 |

* cited by examiner

IGNITION DEVICE FOR A MOTOR, ESPECIALLY IN A MOTOR VEHICLE

The invention concerns an ignition device of the type specified in the introductory clause of Claim 1. It is a manually activated slide in a stationary housing, which is normally held in a home position by a restoring force but can be translationally moved from its home position into one of several operating positions to switch an ignition switch that is electrically connected with the motor from an "off" position into one or more "on" positions that have different actions from one another.

FIGS. 13 to 19 of DE 102 33 511 A1 disclose a two-part slide control system, which determines the desired operating position of the slide. It consists of a pin seated in the slide and of a heart-shaped cam provided on the inner surface of the housing, where at least two locked positions are provided for two positions of the slide. The ignition switch is integrated in the slide and carries out a translational movement between its "off" position and one of several "on" positions that have different actions from one another. This requires a special design of the ignition switch, which is integrated in the housing of the slide. High load currents cannot be switched in an integrated ignition switch of this type.

In ignition devices of a different type, a mechanical key is inserted in a rotating ignition lock, which is directly or indirectly coupled with an ignition switch that is designed as a rotary switch. Starting from a neutral position, a cylinder core of the locking cylinder is rotated into various operating positions, so that the rotary switch is moved into corresponding, mutually angularly displaced "on" positions of its contacts.

The objective of the invention is to develop an ignition device of the type specified in the introductory clause of Claim 1, whose components can also be used in other types of ignition devices, so that inexpensive production of large quantities is made possible. In accordance with the invention, this is achieved by the measures cited in Claim 1, which have the following special significance.

Although the slide carries out a translational movement in the housing in the ignition device of the invention, the corresponding ignition switch can nevertheless be designed as a rotary switch, which carries out a rotary movement for the switching operation of its contacts. This is effected by a specially designed rotor, which is positioned between the slide and the rotary switch, namely, a rotor which is rotatably supported in the housing. The rotor is nonrotatably connected with the input shaft of the ignition switch and at the same time carries one part of the aforementioned slide control system, namely, either the heart-shaped cam or the pin supported therein. This makes the rotor a "converter", which, when the slide is operated, converts its translational movement to rotary movement of the rotary switch. As a result, it is possible to produce the ignition rotary switch in such large quantities that it can be used not only in devices with actuators that have rotary movement but also in devices of the present type with slides that have translational movement. High load currents can be switched in the rotary switch by means of the rotor. Specifically, the rotor keeps the manually operated slide some distance from the rotary switch.

Other features and advantages of the invention are apparent from the dependent claims, the description below, and the drawings. The drawings show two specific embodiments of the invention. The first of these two embodiments is illustrated in FIGS. 1 to 10.

FIG. 1 shows a perspective view of the ignition device of the invention.

FIG. 10 shows a cross section through the shaft of the rotor, where its different rotational positions are drawn in.

The last two figures show a component of an ignition device with an alternative design, namely:

Figure 2:
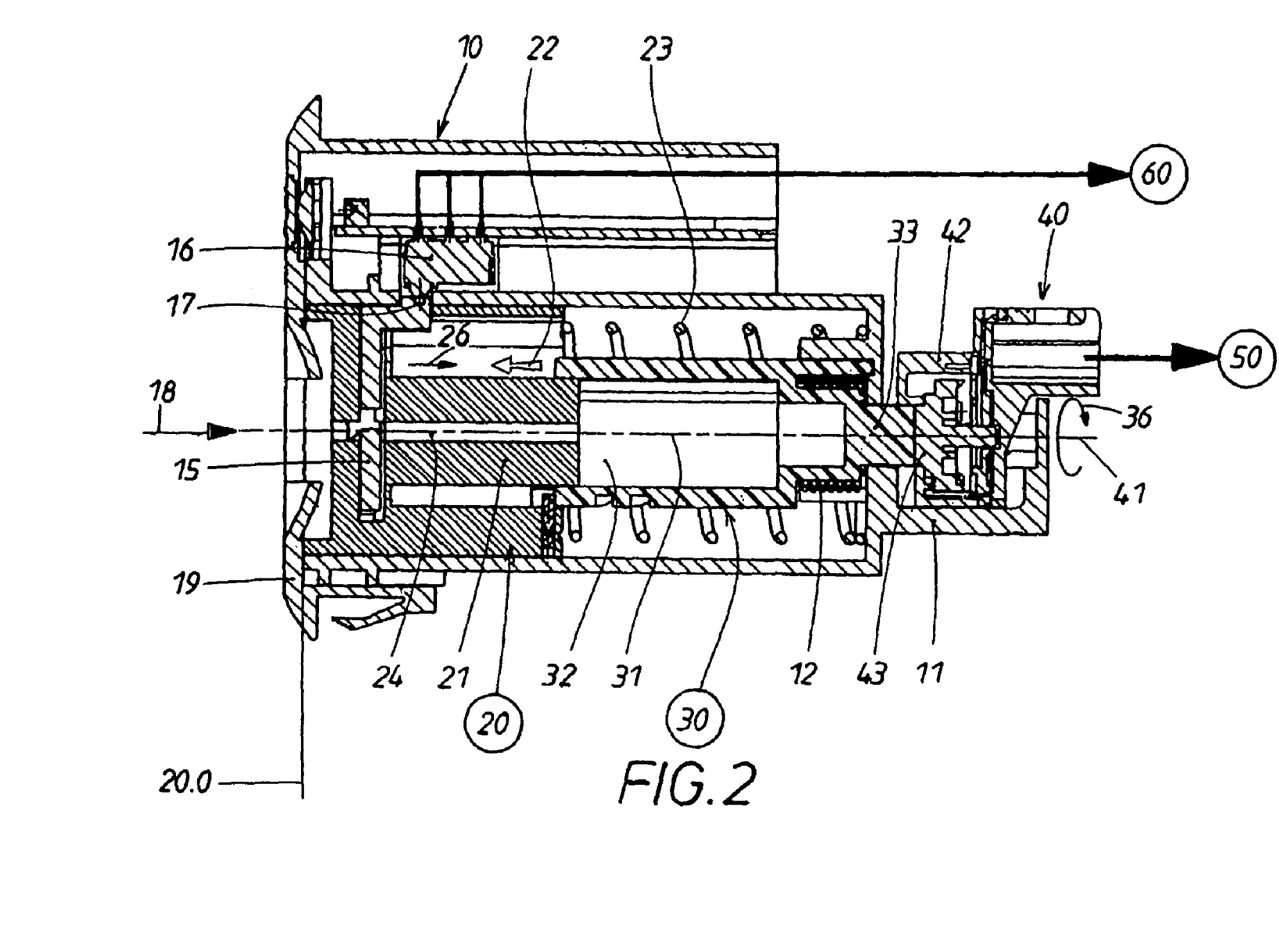
FIG. 2 shows an axial section through the device along sectional line II-II in FIG. 1.
Figure 4:
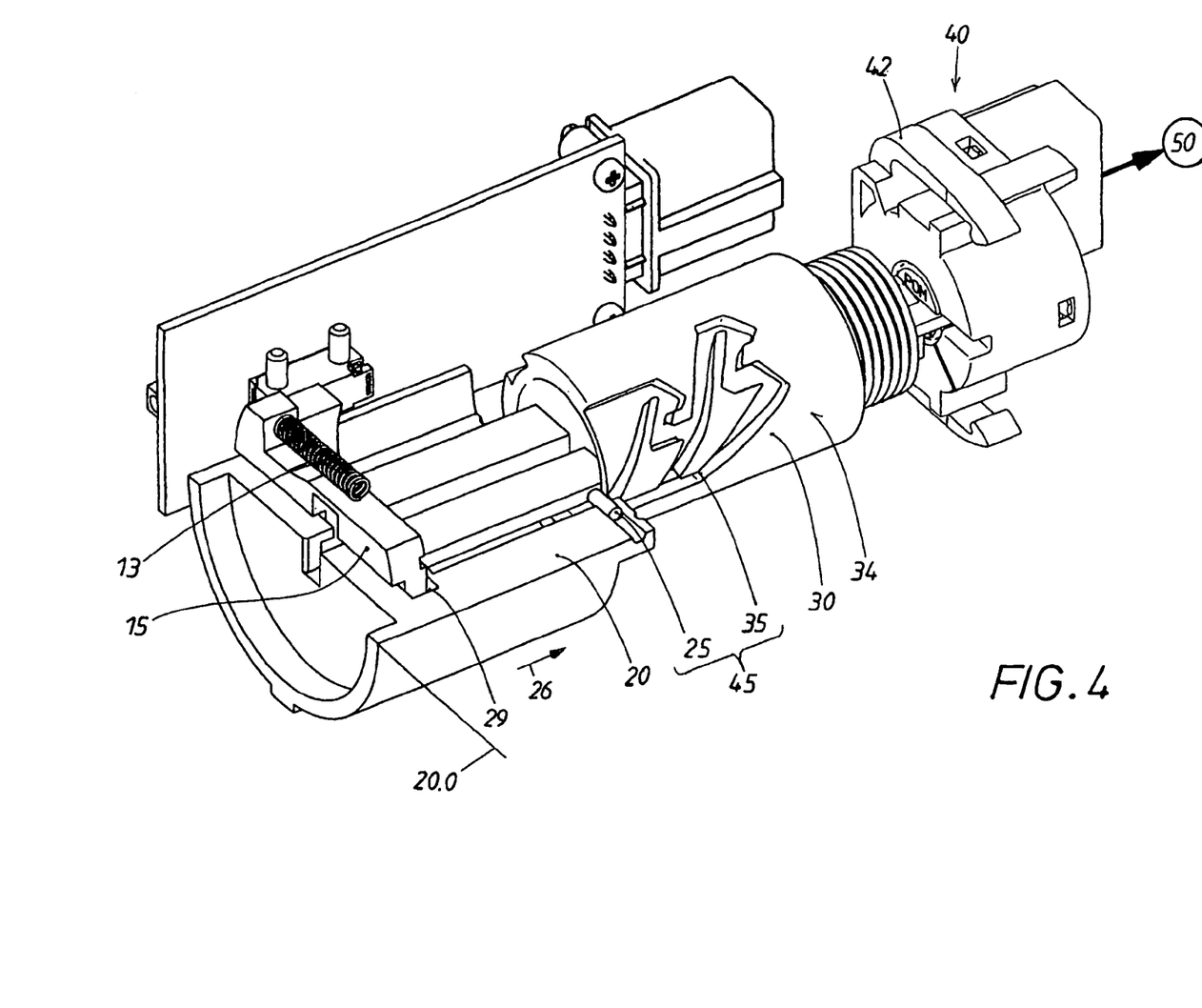
FIG. 4 shows a perspective view, analogous to FIG. 3, of the most important parts inside the housing of the device of the invention.

The most important components inside the device are shown in FIG. 4 in conjunction with FIG. 2. A slide 20 can be translationally moved in a housing 10. A rotor 30 is rotatably supported in the housing. Its axis of rotation 31 is aligned coaxially with an axis of rotation of a rotary switch 40. The rotary switch 40 has its own self-contained switch housing 42, which is held in a housing extension 11. As FIG. 2 shows, the rotor is constructed partially as a bushing, with the bushing interior 32 serving to receive a core piece 21 that is provided in the slide 20.

The core piece 21 has an indirect bearing function of the slide 30 in the housing 10. As a result of the engaging core piece 26, the slide 20 supports one of the cylindrical ends of the rotor 30 in the housing 10. The rotor 30 has a shaft extension 33 at the other end, which is directly supported in the housing 10, and, as FIG. 2 illustrates, is nonrotatably connected with the corresponding input member 43 of the rotary switch 40.

Figure 3:
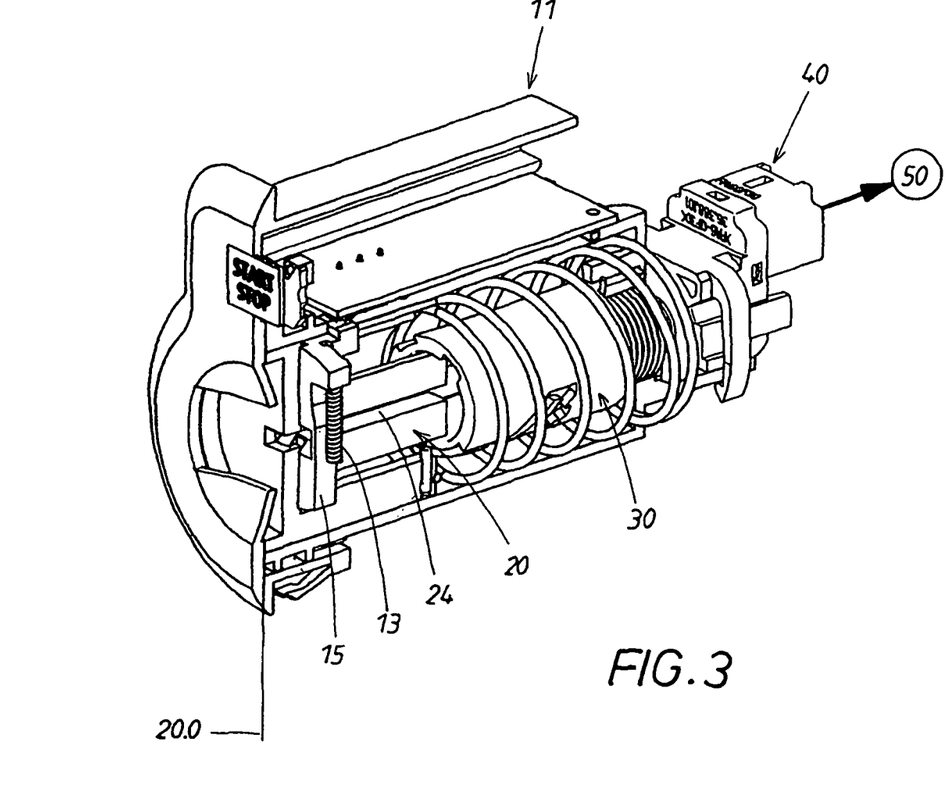
FIG. 3 shows a partial section through only the housing of the device illustrated in FIG. 1, again in a perspective view.

The slide 20 is acted upon by a restoring force, which is illustrated by the arrow 22 in FIG. 2 and which is produced by a helical compression spring 23 that surrounds the rotor 30. The helical compression spring 23 is located in the housing. In addition, a leg spring 12 is mounted between the housing 10 and the rotor 30. It serves to provide a well-defined initial rotary position of the rotor 30 and thus of the input member 43 of the rotary switch 40, which is nonrotatably connected with the rotor 30. In the initial rotary position of the rotor 30, which is shown in FIGS. 2 to 4, the contacts in the rotary switch 40 are in an "off" position. Specifically, a motor vehicle motor 50, which is only symbolically indicated in the drawings, is electrically connected to the rotary switch 40. In the initial position of the rotor 30, the motor 50 receives no electric current.

In the axial center of its core piece 26, the slide 20 has an axial socket 24 for an electronic key 14, which is shown in its inserted state in FIGS. 5 to 8. The key 14 has electronic coding in the form of a transponder, which makes it an "identification transmitter" and allows it to be used as proof of operating authorization for the slide 20.

The slide 20 has a radial chamber 29, which is best seen in FIG. 2 and intersects the axial socket 24. In this chamber 29, there is a lock bolt 15, which is acted upon by a compression spring 13. The housing 10 contains a microswitch 16, which is electrically connected with an identification transmitter 60, which is symbolically indicated at the reference number 60 in FIG. 2. Normally, the lock bolt 15 is held by its compression spring 13 in its locked position, as shown in FIG. 2, in which the key socket 24 is closed and an actuator 17 of the microswitch 16 is pushed in.

However, if the key 14 is inserted into the slide 20 in the direction indicated by arrow 18, then the lock bolt 15 is pushed back against the force of its compression spring 13 and releases the actuator 17 of the microswitch 16. The microswitch 16 signals this to the identification transmitter 60 in the vehicle, and the identification transmitter 60 then communicates monodirectionally or bidirectionally with the electronic key 14. A code interrogation of the transponder present in the key then occurs. If the communication is successful, the identification transmitter 60 releases the electrical connections to the motor 50 of the vehicle via a control unit. The proof of authorization for actuation of the slide is then furnished, and the slide then brings about the various "on" positions in the rotary switch 40 in the following special way.

Figure 5:
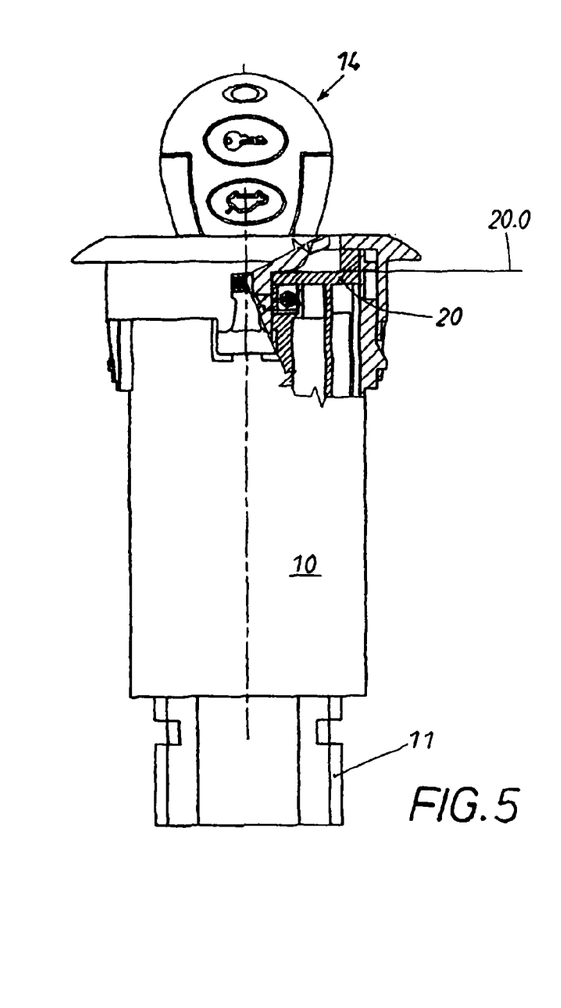
FIGS. 5 to 8 show four different translational positions of a slide provided in the device.
Figure 6:
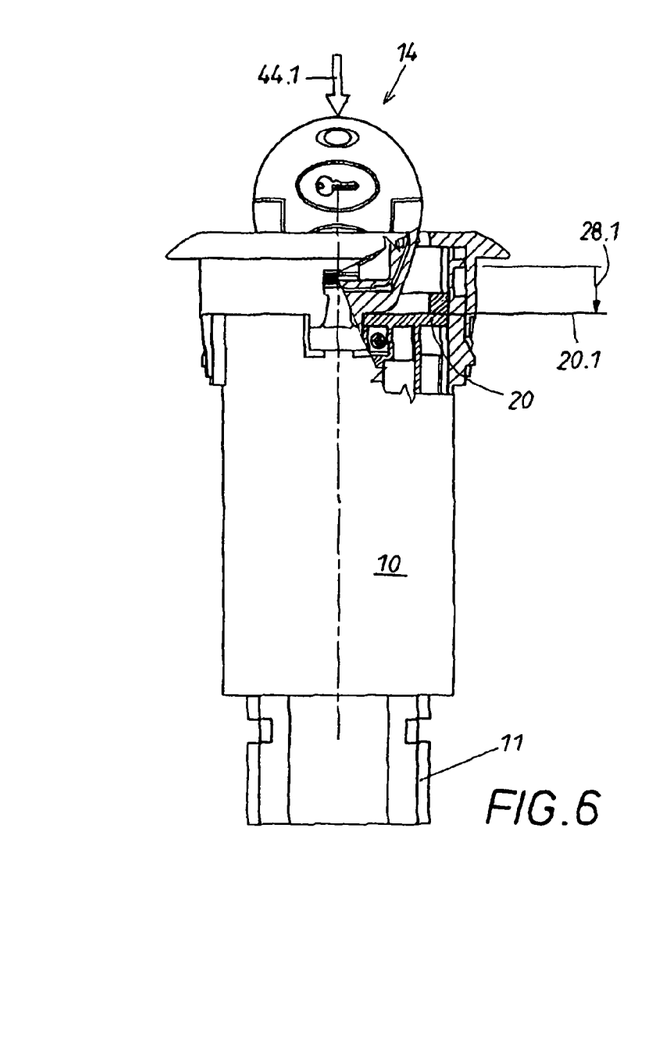
Figure 7:
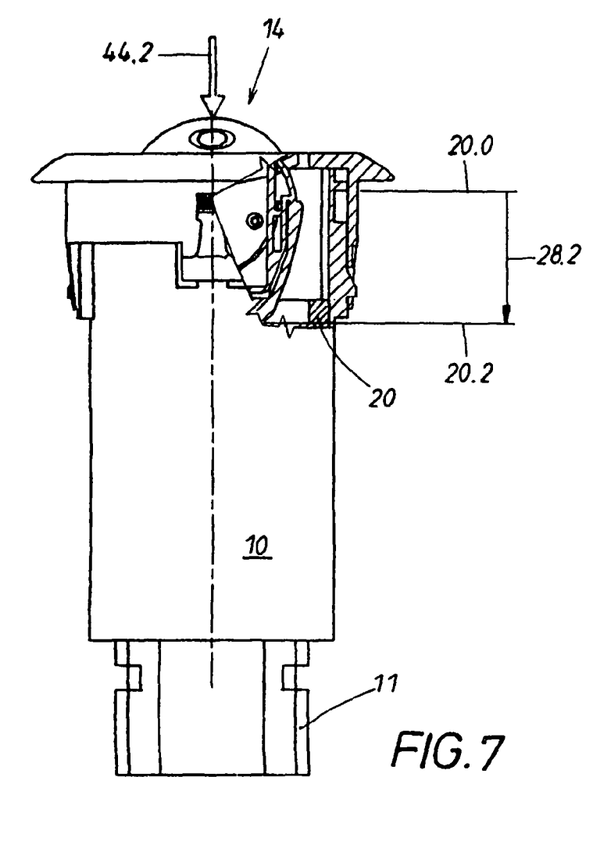
Figure 8:
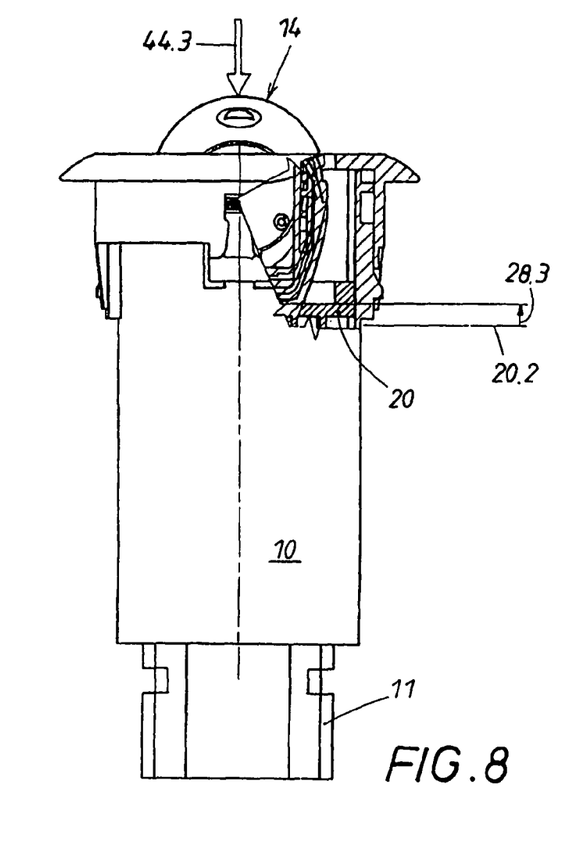

As is shown best in FIGS. 5 to 8, the slide 20 can occupy four different inserted positions, each of which is identified by a different auxiliary line 20.0 to 20.3. FIG. 5 shows a home position 20.0 of the slide, which is determined, on the one hand, by the aforementioned restoring force 22, and, on the other hand, by end stops 19 with the housing 10. This home position 20.0 is also shown in FIGS. 2 to 4. When force is applied to the head of the key 14, the key 14 is pushed in by different amounts in the slide 20 in the direction of arrows 44.1 to 44.3 to move the key 14 out of its home position 20.0, as shown in FIG. 5, into three different operating positions 20.1 to 20.3, as shown in FIGS. 6 to 8. A special slide control system 45 is involved in fixing these operating positions 20.1 to 20.3 and has a dual function.

The slide control system 45 consists of two interacting parts 25, 35. One of the parts of the slide control system 45 is a double-heart-shaped cam 35, which, as is best seen in FIG. 4, is arranged on the cylindrical surface 34 of the rotor 30. The other part of the slide control system 45 consists of a pin 22, which fits into and moves along the groove-like cam 35. This is best seen in FIG. 9.

Figure 9:
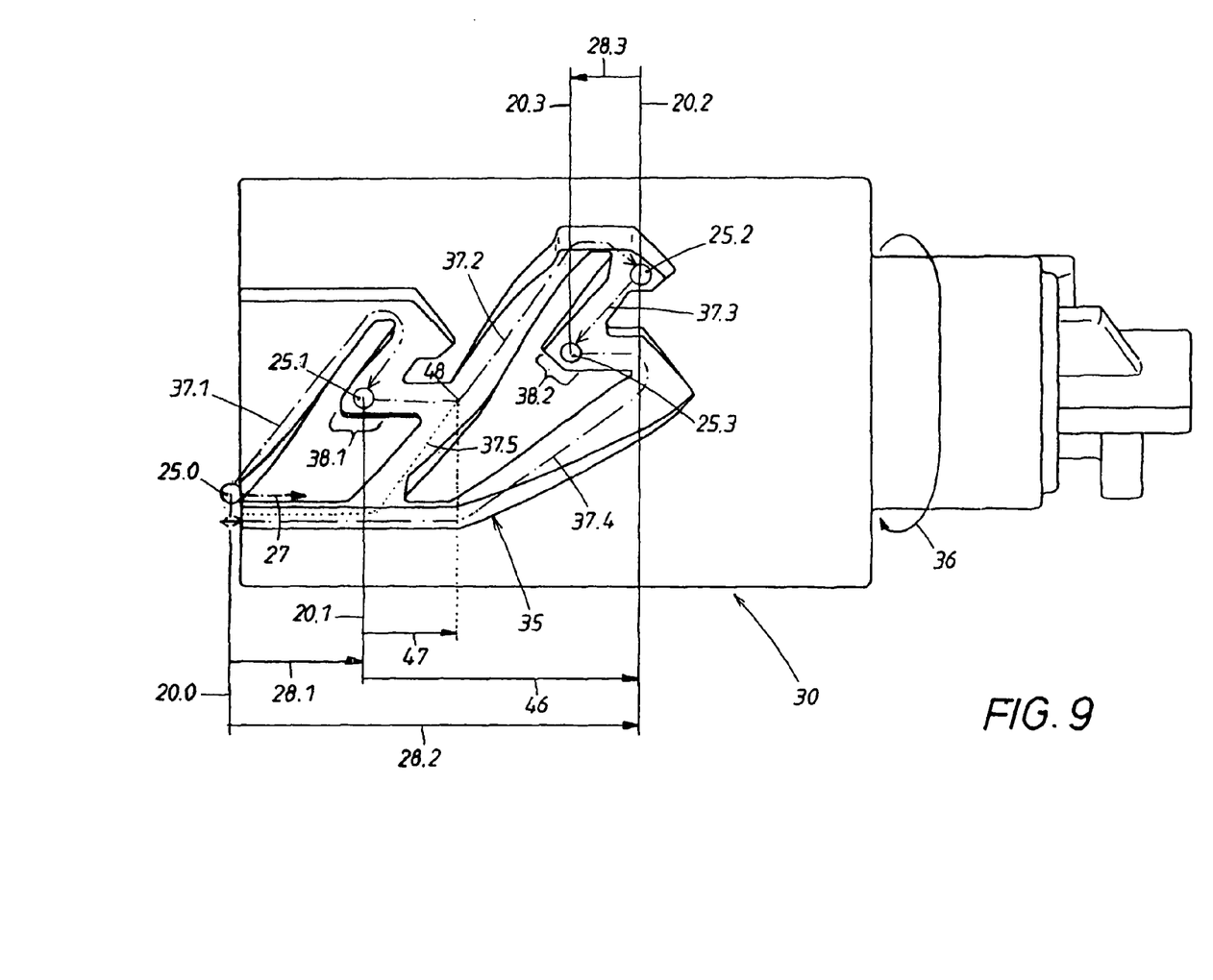
FIG. 9 shows an enlarged side view of a rotor provided in the device, with a flat developed view of the cam provided there in a slide control system.

In FIG. 9, the rotor 30 is shown with a flat developed view of the cam 35 located on it. In the home position 20.0 of the slide 20, the pin 25 seated there occupies the initial position, which is labeled 25.0. The positions of the pin 25 in the three operating positions 20.1 to 20.3 of the slide 20 according to FIGS. 6 to 8 are also shown in FIG. 9 and are labeled 25.1 to 25.3. For reasons of simpler illustration of the conditions, the movements are shown in kinematic reverse in FIG. 9. Due to the translational movement 26 of the slide 20 that is illustrated in FIG. 4, the pin 25 seated in it can also only make translational movements in the direction of the motion arrow 27, which runs parallel to the axis and is shown as a dotted line in FIG. 9. In FIG. 9, the motional conditions are shown in kinematic reverse, namely, as though the cam 35 is at rest, and the pin 25 moves along the cam 35. This results in the paths 37.1 to 37.5, which are shown as dot-dash lines in FIG. 9. This proceeds in the following way.

In the home position of the slide 20 according to FIG. 5, the pin 25 is in the initial position 25.0 of FIG. 9. If a first push-in actuation 44.1 is then carried out, as shown in FIG. 6, the pin 25 then runs along the first inclined surface of the cam 35, as indicated in FIG. 9, and describes the path labeled 37.1 in FIG. 9. This path 37.1 guides the pin into the operating position 25.1 in FIG. 9, in which an undercut in the cam 35 provides a first lock-in position 38.1 for the pin 25. This results in a well-defined operating position 20.1 of the slide 20 according to FIG. 6 and in the travel distance 28.1 of the slide 20 shown in FIG. 6 and FIG. 9.

The aforementioned first function of the rotor 30 is that the pin 25 is temporarily locked in a first operating position 25.1 due to the cam profile of the cam 35 of the slide control system 45, which cam 35 is located on the rotor 30. The second function of the rotor 30 is that this axial travel distance 28.1 of the slide 20 is converted to a corresponding rotational movement shown as angular amount 39.1 in FIG. 10. This rotational movement is illustrated by a rotational arrow 36 in FIGS. 2, 9, and 10. The rotary switch, which is nonrotatably connected with the rotor 30, is thereby converted from an "off" position 40.0 illustrated in FIG. 10 by the auxiliary line 40.0 to a first "on" position 40.1 in FIG. 10. The contacts of the rotary switch 40 are then located in a so-called "ignition position", in which various electrical units in the vehicle, e.g., the radio, are supplied by the on-board electric power supply of the vehicle.

Figures 1, 10:
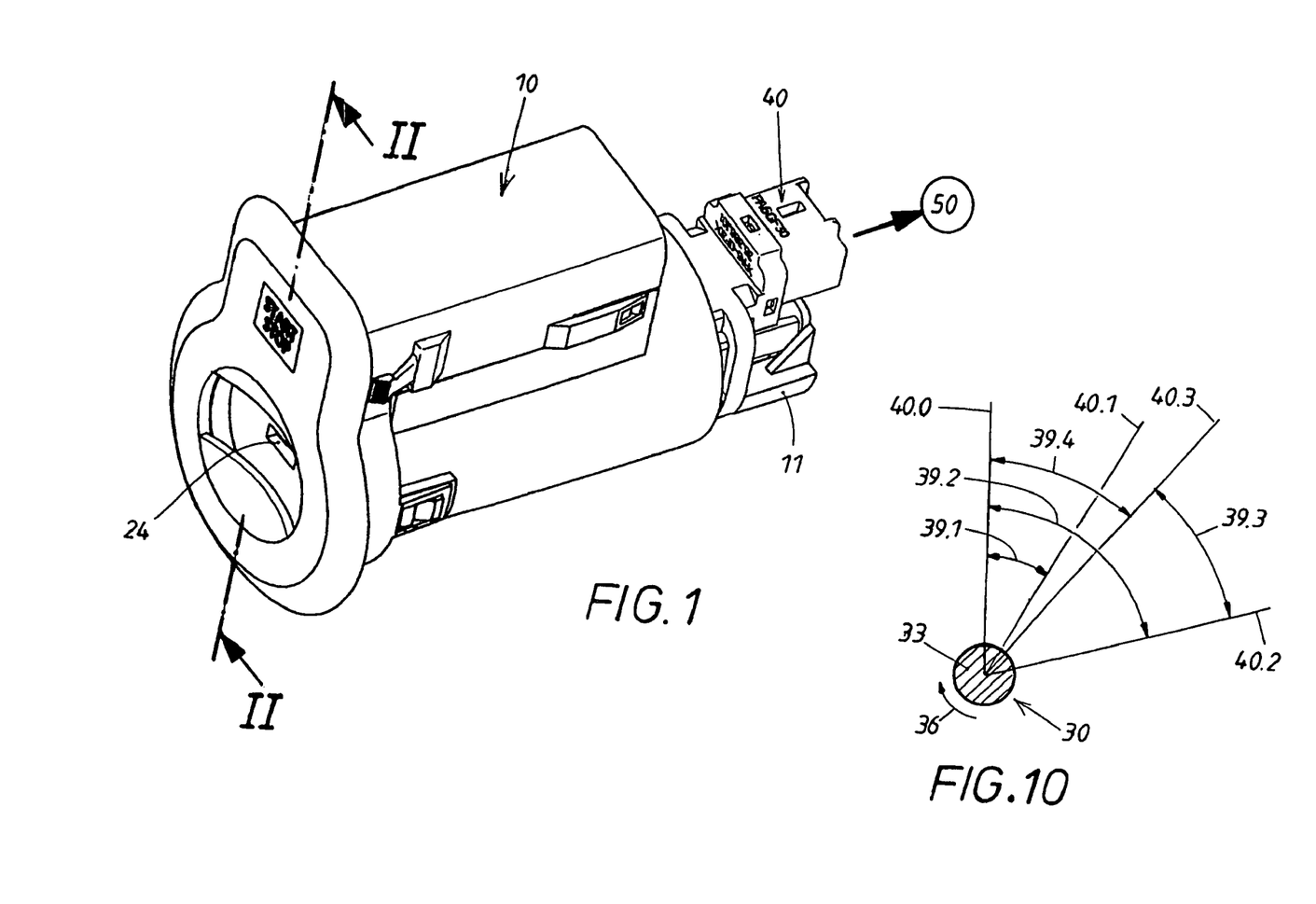

If, starting now from FIG. 6, the key 14 is pushed in farther in the direction of arrow 44.2 in FIG. 7, then, in the drawing of FIG. 9, the pin moves out of its first operating position 25.1 normally farther along its path 37.2, until it reaches an unstable intermediate position, which is labeled 25.2 in FIG. 9. This results in a total travel distance 28.2 of the slide 20, indicated by reference number 28.2 in FIGS. 7 and 9, which transfers it to an unstable second operating position 20.2 in FIG. 7 and is labeled with 25.2 in the kinematic reverse of FIG. 9. This has the practical effect that the rotor 30 and rotary switch 40 are moved by a total angular amount 39.2, as indicated in FIG. 10. The rotary switch is then positioned in the second "on" position, indicated by 40.2 in FIG. 10, in which the associated contacts assume a "start position". The motor is then started by a starter or the like.

As has already been mentioned, this intermediate position 25.2 in FIG. 9 is unstable, because, as FIG. 9 illustrates, the pin 25 is not located in an undercut region of the cam 35. If the operating pressure 44.2 on the key 14 in FIG. 7 is removed, the slide 20 is moved back axially by the restoring force 22 acting on it. This causes the pin, seen in the kinematic reverse in FIG. 9, to move behind an undercut, inclined cam segment, and the pin then lands, after a path length 37.3 in FIG. 9, in a second stable operating position 25.3 in FIG. 9, which constitutes a second lock-in position 38.2 of the pin 25 or of the associated slide 20. This is shown in FIG. 9. It results from a reverse travel distance 28.3, as shown in FIG. 9 and FIG. 8, which transfers the slide 20 into its third operating position 25.3, which is shown in FIG. 8.

The return travel distance 28.3 of the slide manifests itself, in accordance with the aforementioned second function of the rotor, in a corresponding return rotation of the rotor 30 by the angular amount 39.3 shown in FIG. 10. In this way, the rotary switch 40, which is nonrotatably connected with the rotor 30, arrives in its third "on" position 40.2 in FIG. 10, which represents a "drive position" of the associated motor 50. The motor 50 then powers the vehicle.

When the motor 50 is to be shut off after the driving of the vehicle is finished, the key 14 needs only to be pushed in again as indicated by the arrow 44.3 in FIG. 8. FIG. 9 shows what happens then. The pin is lifted out of its operating position 25.3 in lock-in position 38.2 of the cam 35 and follows the path 37.4, which is indicated by a dot-dash line in FIG. 9. It then arrives in an end segment of the cam 35, which moves the pin 25 back into its initial position 25.0 in FIG. 9 by virtue of the restoring force 22 acting on the slide 20. This is the home position 20.0 of the slide 20, which was already shown in FIG. 5. Then, as shown in FIG. 10, the rotor 30 and thus the rotary switch 40 moved back by the angular amount 39.4. The rotary switch 40 has moved out of its third operating position 40.3, which corresponds to the "drive position" of the motor 50, and back to its "off" position 40.0 in FIG. 10, as desired.

As FIG. 9 illustrates, the slide must be brought out of its first stable operating position 20.1, as shown in FIG. 6, by another push-in actuation 44.2, as shown in FIG. 7, to an unstable temporary operating position 20.2, which corresponds to the intermediate position 15.2 of the pin in FIG. 9. That would correspond to an intermediate travel distance 46, as shown in FIG. 9. If, starting from the first stable operating position 25.1 of its pin 25, the slide 20 is pushed in only slightly by a partial travel distance 47, as shown in FIG. 9, then the pin arrives at the point of bifurcation 48 that is seen in FIG. 9. If the actuating pressure applied to the slide 20 via the key 14 is terminated at this point, then the pin can move on the alternative shortcut path 37.5, which is shown in FIG. 9 as a dotted line, and can thus move directly back into its initial position 25.0. The slide 20 has then been moved back out of its first stable operating position 20.1 of FIG. 6 and into its home position 20.0 of FIG. 5.

Figure 11A:
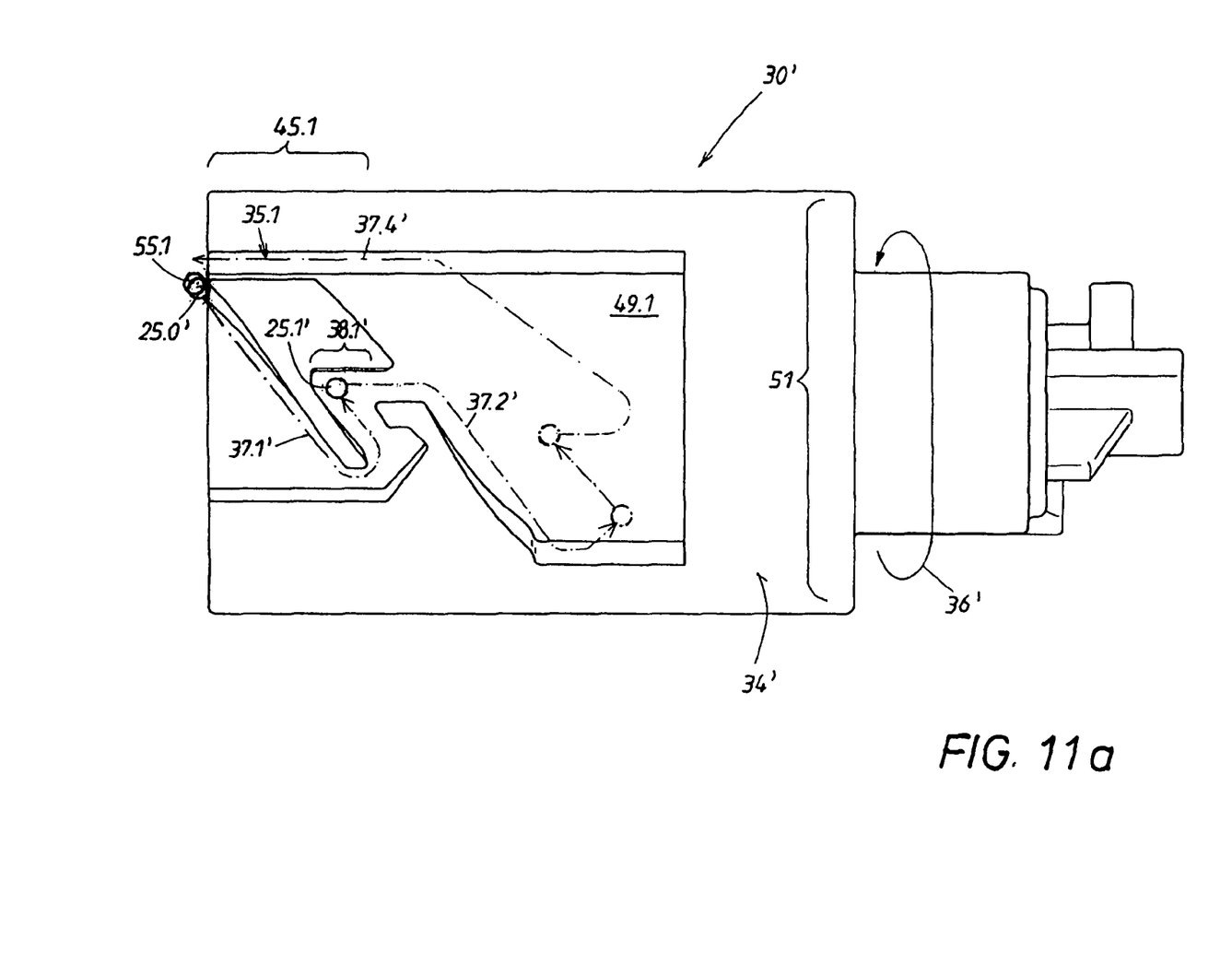
FIG. 11*a* shows one side of a rotor with a modified design in a view that corresponds to FIG. 9.
Figure 11B:
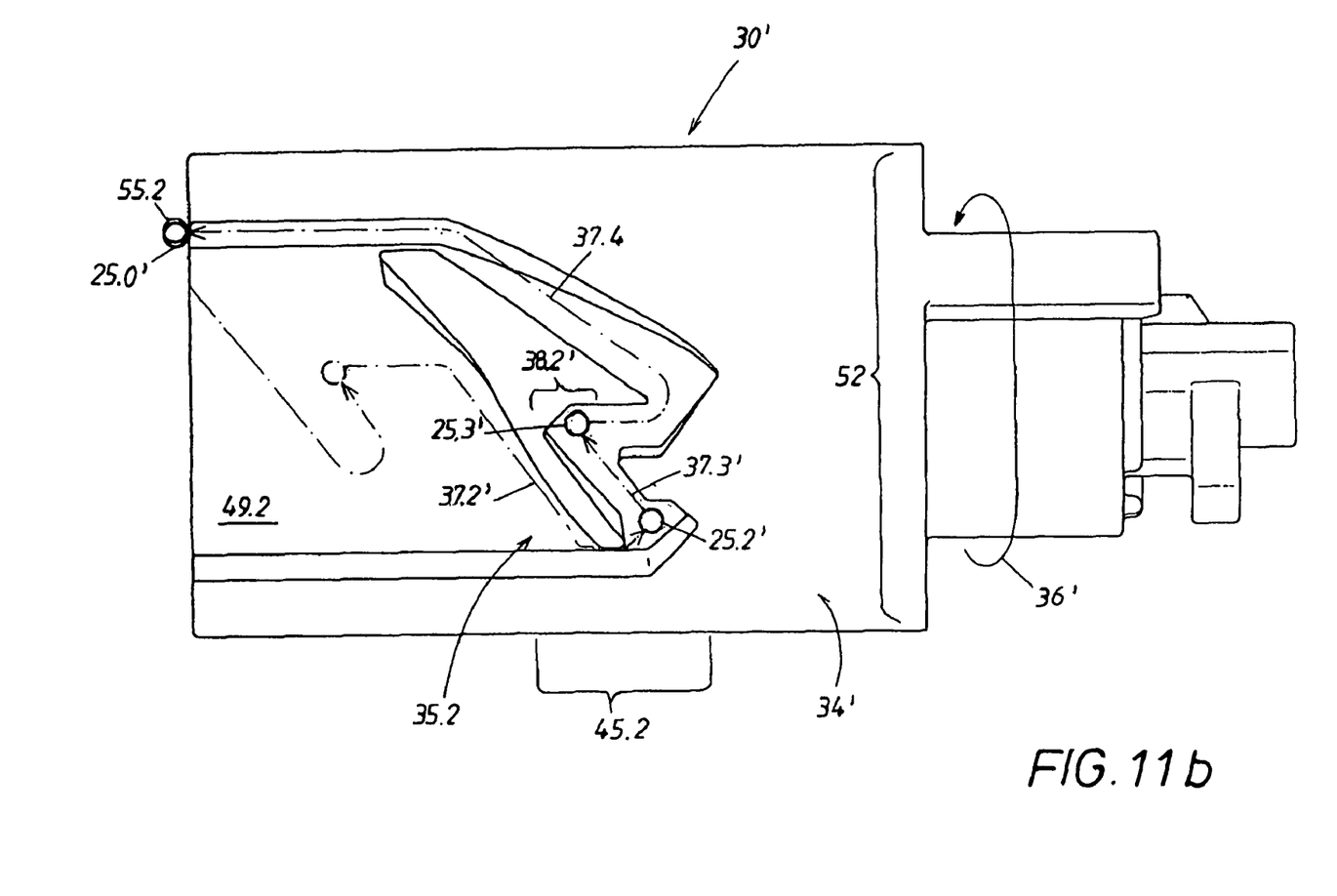
FIG. 11*b* shows the same rotor as in FIG. 11*a* but in an opposite side view.

The last two drawings show a second embodiment of the ignition device of the invention, which is based on a rotor 30' with an alternative design. The remaining components of this second device can be designed analogously to the components of the first device. To this extent, the previous description also applies here. It is sufficient to discuss the differences of this second device from the first device.

The basic difference is that the slide control system in the second embodiment is divided into two slide control systems 45.1 and 45.2, which in this case are located on two opposite sides 51, 52 of the cylindrical surface 34' of the rotor 30'. On one side 51 of the rotor 30', as shown in FIG. 11a, there is a first cam 35.1, in which a first pin 55.1 is guided, while the other slide control system 45.2, with its own cam 35.2 and an associated pin 55.2, is located on the opposite side 52 of the rotor 30', as shown in FIG. 11b. Both FIGS. 11a and 11b are shown, analogously to FIG. 9, as flat developed views of the cylindrical surface of the rotor, and the relative movement between the cams and their pins, namely, 35.1 with 55.1, on the one hand, and 35.2 with 55.2, on the other hand, are shown in kinematic reverse.

For a more detailed explanation of the functioning of the rotor 30' in FIGS. 11a and 11b, the preceding description in connection with FIG. 9 may be referred to. On the first side 51 of the cylindrical surface 34' in FIG. 11a, there is only one small cam segment 35.1, which determines the two positions, which are drawn with solid lines, namely, the initial position 25.0' and the first operating position 25.1' of the first pin 55.1. Thus, only the first path 37.1' and a portion of the second path 37.2' are determined in the cam 35.1 of the first slide control system 45.1. The aforementioned restoring force and the undercut of the cam 35.1 result in only one lock-in position 38.1' on this side 51 of the cylindrical surface 34'. Besides this cam 35.1, this side 51 of the rotor has a free space 49.1, which completely frees the position of this first pin 55.1. In this rear region 49.1, the first pin 55.1 of the first slide control system 45.1 is inoperative. As long as the cam 35.1 of the first slide control system 45.1 acts to determine the position with the pin 55.1, the rotational movement 36' of the rotor 30' occurs in the same way as shown in FIG. 9; this rotational movement then reaches the associated rotary switch and effects the corresponding electrical contact there.

FIG. 11b shows the second slide control system 45.2 on the opposite side 52 of the rotor. The opposite conditions exist on this side 52. In the place where, in the first slide control system 45.1, the cam 35.1 determines the position of the associated pin 55.1, there is a free space 49.2 in the second slide control system 45.2. In this region, therefore, the associated second pin 55.2 is inoperative. The cam 35.2 becomes operative as a guide mechanism for the second pin 55.2 only in the second half of the path 37.2, until the unstable intermediate position 25.2' is reached. This is also the case for the analogous further paths 37.3' and 37.4', which have already been described in connection with FIG. 9.

The cam 35.2 thus determines only the second stable lock-in position 38.2, when the second pin 55.2 is located in the undercut part of the cam 35.2 in the stable operating position 25.3' in FIG. 11b. After passing along the last path 37.4', the pin 55.2 reaches the last segment of this path, from which it moves back across the free space 49.2 to its initial position 25.0', which, as FIG. 11a shows, is again determined by the other cam 35.1 of the first slide control system 45.1. If this second slide control system 45.2 is operative, it also provides, as is likewise indicated in FIG. 11b, the rotary movement 36' of the rotor 30' and of the rotary switch, which is nonrotatably connected with the rotor.

Naturally, it is also possible to provide more than two slide control systems 45.1 and 45.2, which would be arranged with axial and/or radial separation from one another. Instead of a cam arranged on the rotor, it is possible in an alternative design, for the other part of the slide control system, namely, the pin, to be seated on the rotor, while the other part of the slide control system, namely, the cam, is located on the inner surface of the housing.

In the present case, the identification transmitter is an electronic key, which can be inserted in the above-described key socket 24, which is located in the middle of the slide 20. However, it would also be possible to place a key sockets 24 of this type in a separate component outside the slide 20. The critical consideration is that communication is possible between the key and the identification receiver in the vehicle. The key could also have mechanical coding that serves as proof of authorization to operate the associated ignition device.

However, it would also be possible to use a so-called "smart card", which communicates with the associated identification receiver in the vehicle by a so-called "keyless entry" system. In certain cases, a smart card of this type can also be inserted in a receptacle in the vehicle, and the communication then takes place from this location. In this case, the associated slide of the ignition device of the invention is then provided as a manual actuator in order to switch the motor from an "off" position to the aforementioned "on" positions with different operative actions. However, the communication with a smart card can also occur if the authorized individual, who is carrying the smart card on his person, comes into a well-defined position relative to a communication device that is part of the identification receiver in the vehicle.

LIST OF REFERENCE NUMBERS

10 housing
11 housing extension of 10 for 40
12 leg spring, pulse spring for return rotation of 30
13 restoring compression spring for 15
14 identification transmitter, electronic key (FIGS. 5 to 8)
15 plate-shaped lock bolt in 25
16 microswitch in 10 (FIG. 2)
17 actuator of 16 (FIG. 2)
18 arrow of insertion of 14 in 24 (FIG. 2)
19 end stops between 20, 10 (FIG. 2)
20 slide
20.0 home position of 20 (FIG. 5)
20.1 first stable operating position of 20 (FIG. 6)
20.2 unstable operating position of 20 (FIG. 7)

20.3 second stable operating position of 20 (FIG. 8)
21 core piece of 20
22 arrow of the restoring force for 20
23 restoring compression spring for 22
24 axial key socket in 20 (FIG. 2)
25 pin of 45 (FIGS. 1 to 9)
25.0 initial position of 25 (FIG. 9)
25.0' initial position of 55.1 or 55.2 (FIGS. 11a, 11b)
25.1 first stable operating position of 25 (FIG. 9)
25.1' first stable operating position of 55.1 (FIG. 11a)
25.2 unstable intermediate position of 25 (FIG. 9)
25.2' unstable intermediate position of 55.2 (FIG. 11b)
25.3 second stable operating position of 25 (FIG. 9)
25.3' second stable operating position of 25.2 (FIG. 11b)
26 translational movement of 20
27 arrow of movement of 25 parallel to the axis (FIG. 9)
28.1 first travel distance of 20 (FIGS. 6, 9)
28.2 second travel distance of 20 (FIGS. 7, 9)
28.3 third travel distance of 20, return travel distance (FIGS. 8, 9)
29 recess in 20 for 15
30 rotor (FIGS. 2 to 9)
30' alternative rotor (FIGS. 11a, 11b)
31 axis of rotation of 30
32 bushing interior of 30
33 shaft extension of 30
34 peripheral surface of 30, cylindrical surface (FIG. 4)
34' peripheral surface of 30', cylindrical surface (FIGS. 11a, 11b)
35 cam of 45 (FIG. 4)
35.1 cam of 45.1 (FIG. 11a)
35.2 cam of 45.2 (FIG. 11b)
36 arrow of the rotational movement of 30 (FIGS. 2, 10)
36' arrow of the rotational movement of 30' (FIGS. 11a, 11b)
37.1 first path of 25 (FIG. 9)
37.1' first path of 55.1 (FIG. 11a)
37.2 second path of 25 (FIG. 9)
37.2' second path of 55.1 or 55.2 (FIGS. 11a, 11b)
37.3 third path of 25 (FIG. 9)
37.3' third path of 55.2 (FIG. 11b)
37.4 fourth path of 25 (FIG. 9)
37.4' fourth path of 55.2 (FIG. 11b)
37.5 alternative shortcut path of 25 (FIG. 9)
38.1 first lock-in position of 25 or 20 (FIG. 9)
38.1' lock-in position of 55.1 (FIG. 11a)
38.2 second lock-in position of 25 or 20 (FIG. 9)
38.2' lock-in position of 55.1 (FIG. 11b)
39.1 first angular amount of the rotation of 30 or 40 (FIG. 10)
39.2 second total angular amount of the rotation of 30 or 40 (FIG. 10)
39.3 third angular amount of the rotation of 30 or 40 (FIG. 10)
39.4 fourth angular amount of the rotation of 30 or 40 (FIG. 10)
40 rotary switch
40.0 "off" position of 40 (FIG. 10)
40.1 first "on" position of 40 (FIG. 10)
40.2 second "on" position of 40 (FIG. 10)
40.3 third "on" position of 40 (FIG. 10)
41 axis of rotation of 40
42 switch housing of 40
43 input member of 40
44.1 first arrow of the push-in movement (FIG. 6)
44.2 second arrow of the push-in movement (FIG. 7)
44.3 third arrow of the push-in movement (FIG. 8)
45 slide control system between 20 and 30 (FIG. 4)
45.1 first slide control system on 51 of 30' (FIG. 11a)
45.2 first slide control system on 52 of 30' (FIG. 11b)
46 intermediate travel position between 25.1, 25.2 (FIG. 10)
47 partial travel distance 25.1, 48 (FIG. 10
48 point of bifurcation of 35 (FIG. 10)
49.1 free space in 35.1 (FIG. 11a)
49.2 free space in 35.2 (FIG. 11b)
50 motor
51 first side of 34' (FIG. 11a)
52 second side of 34' (FIG. 11b)
55.1 pin of 45.1 (FIG. 11a)
55.2 pin of 45.2 (FIG. 11b)
60 identification receiver

The invention claimed is:

1. An ignition device for a motor (50), especially in a motor vehicle,
with a stationary housing (10) and a slide (20) that can be manually operated (44.1 to 44.3) therein against a restoring force (22),
which slide (20) can be moved translationally (26) from a home position (20.0), which is determined by the restoring force (22) and end stops (19), into one of several operating positions (20.1 to 20.3),
with at least one two-part slide control system (45), which determines the desired operating position (20.1 to 20.3) of the slide (20),
where one of the parts of the slide control system (45) consists of a cam (35), and the other part consists of a pin (25) guided therein,
and at least two lock-in positions (38.1, 38.2) are provided in the slide control system (45) for at least two positions (20.1, 20.2) of the slide (20),
with an ignition switch (40) that is electrically connected with the motor (50),
which ignition switch (40) can be reversed—depending on the translational movement (26) of the slide (20)—from its "off" position (40.0) to one of several "on" positions (40.1 to 40.3) with different operative actions,
including an ignition position (40.1), a start position (40.2), and a drive position (40.3) of the motor (50),
with a loose identification transmitter (14), which serves as proof of authorization to operate the slide (20) and is in the possession of the authorized person,
and with a stationary identification receiver (60) in the motor vehicle, which communicates with the associated identification transmitter (14) when the identification transmitter (14) is brought into a well-defined operative position relative to the ignition device, after which, if communication is successful, the identification receiver (60) activates the ignition switch (40),
wherein
the ignition switch is a rotary switch (40), which has a rotatable input member (43) for switching its contacts,
where a rotor (30) is rotatably supported in the housing (10) and is nonrotatably connected with the input member (43) of the ignition switch (40),
where the rotor (30) constitutes one part of the slide control system (45), which has at least two lock-in positions (38.1, 38.2) for at least two stable operating positions (25.1, 25.3) of the slide (20), and
when the slide (20) is actuated (44.1 to 44.3), the slide control system (45) on the rotor (30) converts the translational movement (26) of the slide (20) into a rotary movement (36) of the rotary switch (40).

2. A device in accordance with claim 1, wherein the identification transmitter is a mechanical and/or electric key (14) and that the device has a socket (24) for receiving the key (14).

3. A device in accordance with claim 2, wherein the socket (24) for the key (14) is located in the slide (20) and where, when the slide (20) is actuated (44.1 to 44.3), it can be moved translationally together with the inserted key (14).

4. A device in accordance with claim 1, wherein the actuation (26) of the slide (20) is a push-in movement (44.1 to 44.3), which pushes the slide (20) out of its extended home position (20.0) into one of the operating positions (20.1 to 20.3), which differ from one another by the travel distance of the slide.

5. A device in accordance with claim 4, wherein the push-in movement (26) of the slide (20) is axially aligned with the axis of rotation (41) of the rotary ignition switch (40).

6. A device in accordance with claim 1, wherein the identification transmitter is a so-called "smart card", which communicates with the identification receiver by a so-called "keyless entry" system.

7. A device in accordance with claim 1, wherein the pin (25) of the slide control system (45) can be translationally moved with the slide (20) upon actuation (44.1 to 44.3) of the slide (20), and
where the cam of the slide control system (45) is arranged on the peripheral surface (34) of the rotor (30).

8. A device in accordance with claim 7, wherein the pin (25) of the slide control system (45) is seated on the slide (20).

9. A device in accordance with claim 7, wherein the rotor (30) has a cylindrical design and that the cam (35) of the slide control system (45) is seated on the cylindrical surface (34).

10. A device in accordance with claim 1, wherein the pin can be rotated with the rotor and that the cam of the slide control system is located on the inner surface of the housing.

11. A device in accordance with claim 10, wherein the pin is seated on the rotor.

12. A device in accordance with claim 1, wherein the rotor (30) consists of a cylindrical bushing,
where, in the home position (20.0), an inner end piece of the slide (20) fits into the bushing interior (32) of the rotor (30) and serves the purpose of rotatably supporting this open end of the bushing of the rotor (30) in the housing (10),
and where upon actuation (44.1 to 44.3) of the slide (20) into the other operating positions (20.1 to 20.3), the slide (20) moves deeper and deeper into the bushing interior (32).

13. A device in accordance with claim 12, wherein the other end of the bushing of the rotor (30) is closed and supports a shaft extension (33), which is rotatably supported in the housing (10) and is nonrotatably connected with the input member (43) of the rotary switch (40).

14. A device in accordance with claim 12, wherein a helical compression spring (23) produces the restoring force (22) that acts on the slide (20),
where the compression spring (23) is supported at one end on the housing (10) and at the other end on the slide (20),
where the rotor (30) is mounted inside the helix of the compression spring (23),
and where the cylindrical surface (34) of the rotor (30), which supports the cam (35) of the slide control system (45), is radially separated from the helix of the compression spring (23).

15. A device in accordance with claim 1, wherein the slide control system has at least two separate cams (35.1; 35.2) and two pins (55.1; 55.2), which constitute two slide control systems (45.1; 45.2), which are separated from each other,
where the cam (35.1; 35.2) of each of these slide control systems (45.1; 45.2) has only one lock-in position (38.1; 38.2) for the associated pin (55.1; 55.2).

16. A device in accordance with claim 15, wherein the total operation of the slide (20) out of its home position (20.0) into its various operating positions (20.1 to 20.3) is divided into several path segments (37.1', 37.2'; 37.3', 37.4') in the slide control systems (45.1; 45.2),
and where only one of the slide control systems (45.1) is active in one of the path segments (37.1', 37.2'), while the other slide control system (45.2) is inactive in this path segment (37.1', 37.2').

17. A device in accordance with claim 16, wherein the inactive slide control systems (45.1; 45.2) have cam-free free spaces (49.1; 49.2) for their pins (55.1; 55.2) in the operating regions that are not critical for them.

18. A device in accordance with claim 15, wherein the cams (35.1; 35.2) of two independent slide control systems (45.1; 45.2) are positioned on opposite sides (51, 22) of the peripheral surface (34') of the rotor (30).

19. A device in accordance with claim 15, wherein the two pins (55.1; 55.2) for the cams (35.1; 35.2) of the two slide control systems (45.1; 45.2) are seated on the slide (20) with axial and/or radial displacement from each other.

* * * * *